(12) United States Patent
Cheng et al.

(10) Patent No.: US 12,353,083 B2
(45) Date of Patent: Jul. 8, 2025

(54) FRAME STRUCTURE, BACKLIGHT MODULE AND DISPLAY DEVICE

(71) Applicant: Radiant Opto-Electronics Corporation, Kaohsiung (TW)

(72) Inventors: Po-Mao Cheng, Kaohsiung (TW); Chang-Ching Yen, Kaohsiung (TW); Cheng-Te Chang, Kaohsiung (TW); Pei-Fen Hou, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/610,165

(22) Filed: Mar. 19, 2024

(65) Prior Publication Data

US 2024/0337874 A1 Oct. 10, 2024

Related U.S. Application Data

(63) Continuation of application No. PCT/CN2023/087355, filed on Apr. 10, 2023.

(51) Int. Cl.
*G02F 1/13* (2006.01)
*G02F 1/1333* (2006.01)
*G02F 1/13357* (2006.01)

(52) U.S. Cl.
CPC .. *G02F 1/133314* (2021.01); *G02F 1/133602* (2013.01)

(58) Field of Classification Search
CPC . G02F 1/1333; G02F 1/1335; G02F 1/133602
See application file for complete search history.

(56) References Cited

U.S. PATENT DOCUMENTS

| | | | |
|---|---|---|---|
| 6,724,445 B2 * | 4/2004 | Natsuyama | G02F 1/133308 361/801 |
| 7,142,264 B2 * | 11/2006 | Choi | G02F 1/133604 349/65 |
| 2002/0093811 A1 | 7/2002 | Chen | |

FOREIGN PATENT DOCUMENTS

| | | |
|---|---|---|
| CN | 1371018 | 9/2002 |
| CN | 201322261 | 10/2009 |
| CN | 110426897 A | 11/2019 |
| CN | 216387644 U | 4/2022 |
| JP | 2013235185 | 11/2013 |
| WO | 2022001105 A1 | 1/2022 |

* cited by examiner

*Primary Examiner* — Michael A Faragalla

(57) ABSTRACT

A frame structure includes a back frame and a fixing frame combined on the back frame. The fixing frame includes multiple buffering zones, and each of the buffering zones has an upper extension and a lower extension. The upper extension and the lower extension are spaced apart from each other along a first axis without contacting each other and extending toward each other along a second axis. The first axis is not parallel to the second axis. The deformation of the fixing frame can be absorbed when it expands by utilizing the design that the upper extension and lower extension of each buffering zone without contacting with each other. It can avoid the possibility of the fixing frame warping or falling off from the back frame due to thermal expansion, thereby prolonging the service life of the frame structure. The present invention also provides a backlight module and a display device including the frame structure.

12 Claims, 9 Drawing Sheets

FRAME STRUCTURE, BACKLIGHT MODULE AND DISPLAY DEVICE

RELATED APPLICATIONS

This application is a continuation application of International Application No. PCT/CN2023/087355, filed on Apr. 10, 2023, which claims priority to China Application Serial Number 202310119872.9, filed on Feb. 14, 2023. The entire disclosures of all the above applications are hereby incorporated by reference.

FIELD OF THE INVENTION

The present invention relates to a frame structure, particularly a frame structure capable of absorbing deformation, and a backlight module and a display device that include the frame structure.

BACKGROUND OF THE INVENTION

Conventional display devices typically comprise a display panel and a backlight module, with the backlight module connecting to the display panel through its frame components. Currently, backlight modules used in automotive applications must undergo rigorous environmental testing, such as high-temperature experiments. In high-temperature or temperature-varying environments, the frame components often warp or deform due to heating. Generally, the assembly is completed by using adhesive tape to affix an outer frame to a back frame. When the deformation resulting from the thermal expansion of the outer frame surpasses the adhesive force of the tape, there is a possibility that the outer frame may detach from its weakly adhered areas, leading to potential peeling.

Hence, a significant challenge lies in finding ways to improve the stability of the outer frame without introducing extra components, all the while preventing the outer frame from undergoing easy deformation due to heat.

SUMMARY OF THE INVENTION

One object of the present invention is to provide a frame structure capable of absorbing the deformation caused by thermal expansion.

The frame structure comprises a back frame, and a fixing frame attached to the back frame. The fixing frame includes multiple buffering zones, each of the buffering zones having an upper extension and a lower extension, each of the upper extensions and the corresponding lower extension being spaced apart along a first axis without mutual contact and extending towards each other along a second axis, wherein the first axis is non-parallel to the second axis.

In a preferable embodiment, the edges of the upper extension and lower extension of each of the buffering zones are aligned with each other along a third axis. The third axis is simultaneously perpendicular to both the first axis and the second axis.

In a preferable embodiment, the upper extension of each of the buffering zones extends along the second axis to partially overlap with the lower extension.

In a preferable embodiment, the upper extension of each of the buffering zones extends along the second axis to form a gap with the lower extension.

In a preferable embodiment, the lower surface of the upper extension and the upper surface of the lower extension of each of the buffering zones both horizontally extend.

In a preferable embodiment, the lower surface of the upper extension and the upper surface of the lower extension of each of the buffering zones both extend at an inclined angle.

In a preferable embodiment, the fixing frame comprises a frame portion and a surrounding portion around the frame portion. A slit is formed along a third axis between the edges of the upper extension and lower extension of each of the buffering zones, and the third axis is simultaneously perpendicular to both the first axis and the second axis.

In a preferable embodiment, the slit of each of the buffering zones extends inward from the periphery of the surrounding portion along the third axis and does not extend to the frame portion.

In a preferable embodiment, at least one of the upper extension and lower extension of each of the buffering zones forms a gap with the surrounding portion, and the gap extends in the same direction as the upper extension or lower extension.

In a preferable embodiment, the surrounding portion of the fixing frame further comprises at least one groove, and the at least one groove extends along the direction of the second axis or the third axis.

In a preferable embodiment, the surrounding portion within each of the buffering zone has a first base and a second base, the first base and the second base are spaced apart from each other. The upper extension tapers in thickness as it extends from the first base towards the second base, and the lower extension tapers in thickness as it extends from the second base towards the first base.

The frame structure comprises a back frame, and a fixing frame attached to the back frame. The fixing frame includes multiple buffering zones situated at each corner thereof. Each of the buffering zones has a corner plate section, a first plate section, and a second plate section. The corner plate section is separated from both the first plate section and second plate section along a first axis and ensuring no direct contact. The first plate section and second plate section are located on different sides of the fixing frame and extending towards the corner plate section to define a slit.

Another object of the present invention is to provide a backlight module which comprises the frame structure as described above, and an optical unit. The optical unit is jointly held and positioned by the fixing frame and the back frame.

Another object of the present invention is to provide a display device which comprises the backlight module as described above, and a display panel arranged on the backlight module.

The characteristic of the present invention is that the fixing frame of the frame structure is equipped with the buffering zones, featuring a segmented design. The design utilizes the non-contact arrangement between the upper extension and lower extension of the buffering zone along the first axis, thereby preserving space for expansion deformation. When the fixing frame undergoes thermal expansion, the upper extension and lower extension can be guided along the second axis, extending towards each other. This mechanism absorbs the deformation caused by the expansion of the fixing frame, preventing the fixing frame from warping, or detaching from the back frame due to thermal expansion. Consequently, it prolongs the service life of the frame structure.

DETAILED DESCRIPTION OF THE INVENTION

The detailed description and preferred embodiments of the invention will be set forth in the following content and provided for people skilled in the art to understand the characteristics of the invention.

Figure 1:
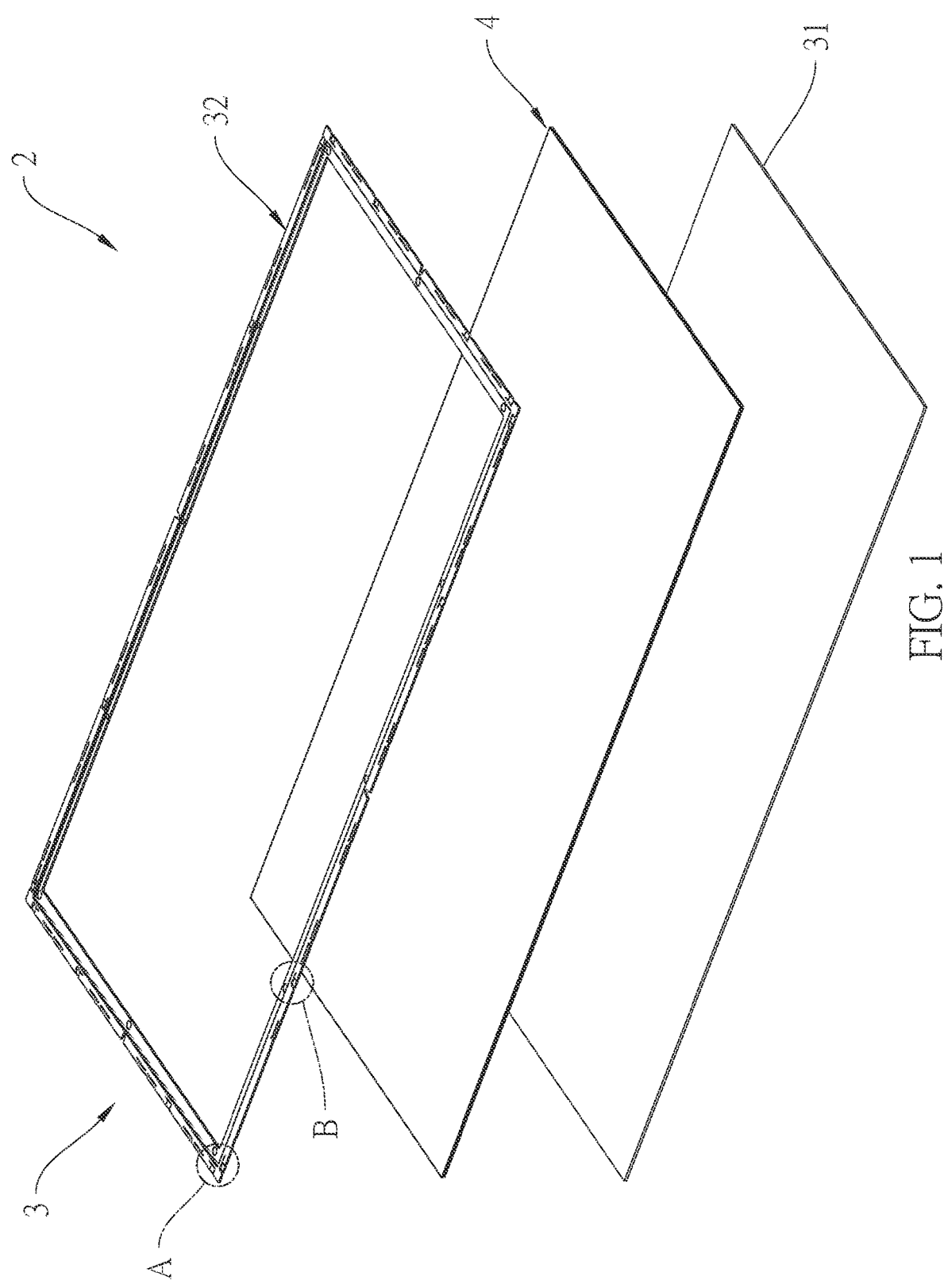
FIG. 1 is a three-dimensional exploded diagram according to a preferred embodiment of a backlight module of this invention.

Referring to FIG. 1, it is a preferred embodiment of the backlight module 2 of the present invention. The backlight module 2 comprises a frame structure 3 and an optical unit 4 clamped by the frame structure 3. The optical unit 4 comprises a light source (not shown) and multiple optical films. The composition of the optical unit 4 is not the focus of the present invention and will not be further elaborated here. The frame structure 3 comprises a back frame 31 and a fixing frame 32 assembled on the back frame 31. In the present invention, the structural design of the fixing frame 32 enables it to absorb the deformation amount during expansion, thereby preventing the fixing frame 32 from warping or detaching from the back frame 31 due to thermal expansion.

Figure 2:
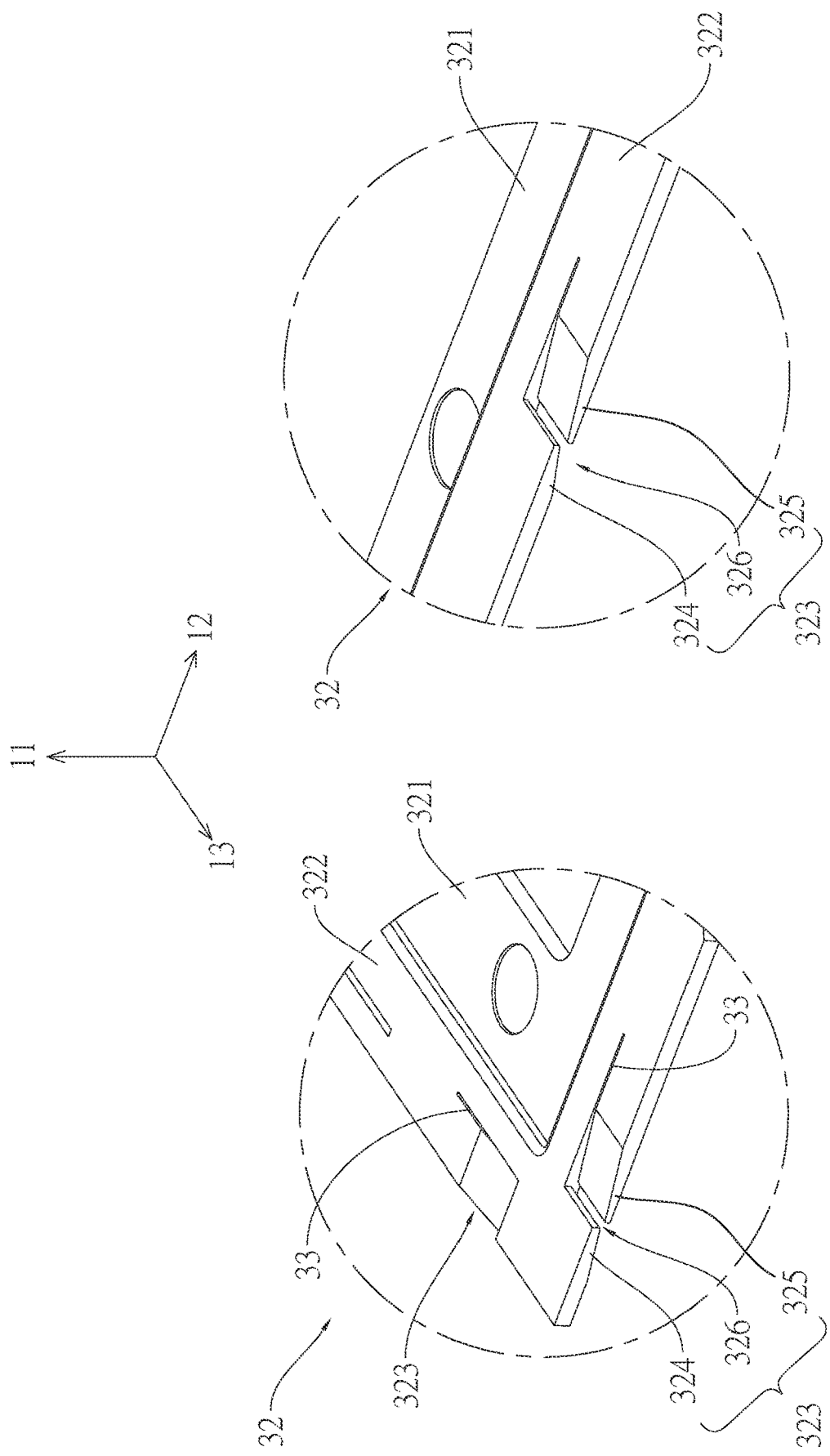
FIG. 2a is a three-dimensional diagram depicting an enlarged view of the indicated area A of the fixing frame in FIG. 1.
FIG. 2b is a three-dimensional diagram depicting an enlarged view of the indicated area B of the fixing frame in FIG. 1.

In more detail, referring to FIG. 2a, the fixing frame 32 comprises a frame portion 321, a surrounding portion 322 surrounding the frame portion 321, and multiple buffering zones 323 formed on the surrounding portion 322. In this embodiment, the fixing frame 32 is a rectangle as shown in FIG. 1. The buffering zones 323 can be distributed not only near the corners of the fixing frame 32, as shown in FIG. 2a, but also at the midpoints of the four edges, as shown in FIG. 2b. Wherein, FIG. 2a is an enlarged view of the area A in FIG. 1, and FIG. 2b is an enlarged view of the area B in FIG. 1. When the fixing frame 32 expands, it exerts a suppressing effect at the mentioned corners or edge positions. Therefore, in the automotive environment, this ensures the adhesion of the fixing frame 32 without the need for additional materials, achieving the technical effect of preventing the peeling of the fixing frame 32.

Figure 3:
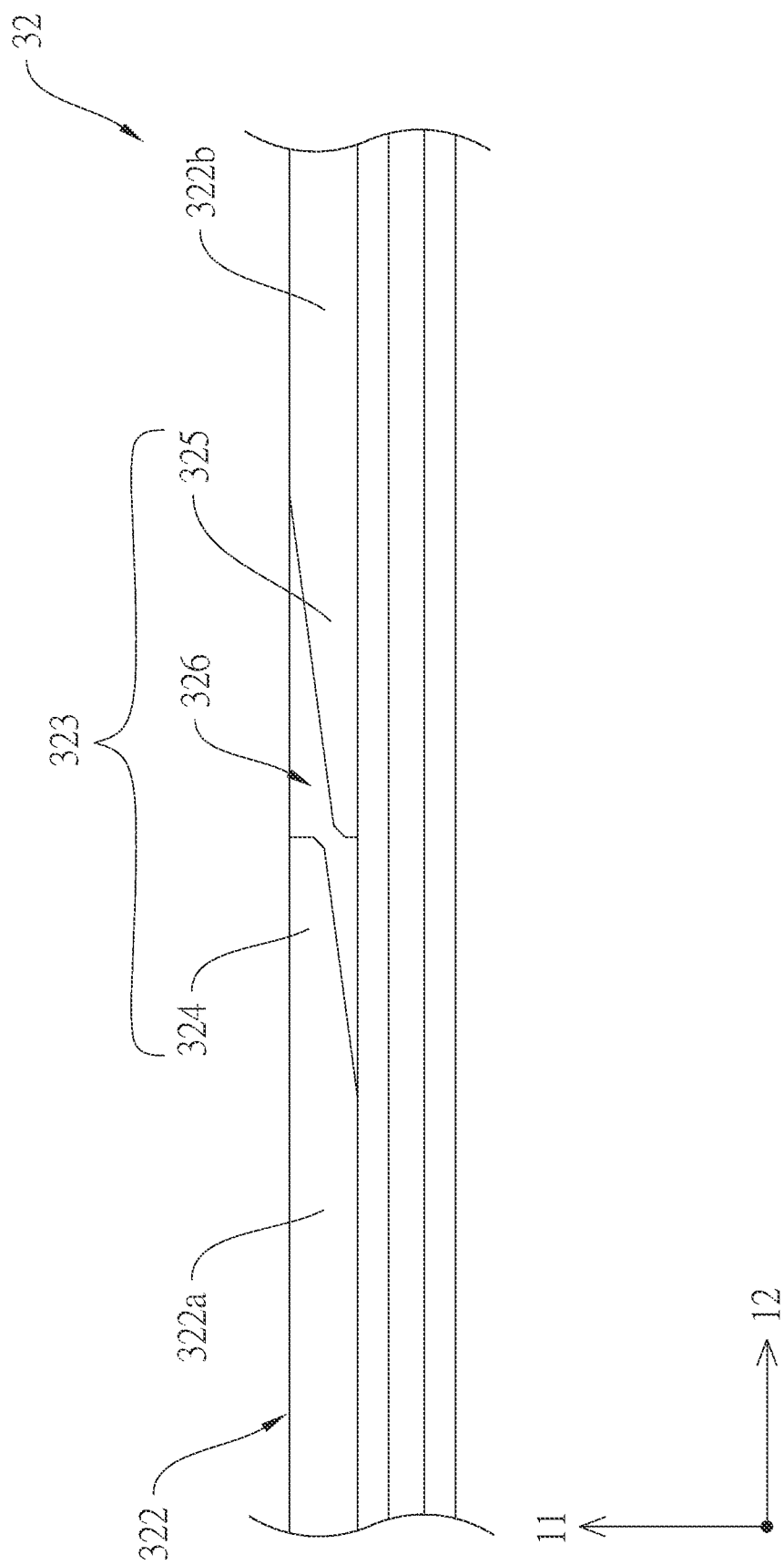
FIG. 3 is a side view diagram illustrating the structure of one of the buffering zones of the fixing frame.

Referring to FIG. 2a, FIG. 2b, and FIG. 3, each of the buffering zones 323 comprises an upper extension 324 and a lower extension 325. Each of the upper extensions 324 and the corresponding lower extension 325 being spaced apart along a first axis 11 without mutual contact and extending towards each other along a second axis 12, wherein the first axis 11 is non-parallel to the second axis 12. The design of the buffering zones 323 on the fixing frame 32 results in a segmented appearance. Moreover, the upper extension 324 and the lower extension 325 of each buffering zone 323 do not contact with each other because they are spaced apart along the first axis 11. This arrangement preserves space for expansion deformation. When the fixing frame 32 undergoes thermal expansion, the upper extension 324 and the lower extension 325 are guided along the second axis 12 to extend toward each other. This process absorbs the deformation amount caused by the thermal expansion of the fixing frame 32. Therefore, the effect of stress release will be achieved without adding additional materials. It prevents the fixing frame 32 from bulging due to the compressive force exerted during expansion, offering a solution that avoids the need for additional materials. Therefore, this helps to avoid the problem of the fixing frame 32 bulging due to expansion, which could lead to detachment from the bottom adhesive and the subsequent detachment of the fixing frame 32 from the back frame 31.

In this embodiment, a slit 326 is formed along a third axis 13 between the edges of the upper extension 324 and lower extension 325 of each of the buffering zones 323, and the third axis 13 is simultaneously perpendicular to both the first axis 11 and the second axis 12. It is note that, in the description of this preferred embodiment, the first axis 11, the second axis 12, and the third axis 13 are illustrated with reference to the angle facing the buffering zone 323 in the lower-left corner of FIG. 2a. FIG. 3 provides a side view of the buffering zone 323 in the lower-left corner of FIG. 2a.

In this embodiment, as shown in FIG. 3, the surrounding portion 322 within each of the buffering zone 323 has a first base 322a and a second base 322b, and the first base 322a and the second base 322b are spaced apart from each other. The upper extension 324 tapers in thickness as it extends from the first base 322a towards the second base 322b, and the lower extension 325 tapers in thickness as it extends from the second base 322b towards the first base 322a. In other words, the upper extension 324 and the lower extension 325 have a wedge-shaped structure. Therefore, the lower surface of the upper extension 324 and the upper surface of the lower extension 325 extend in an inclined manner.

Figure 4:
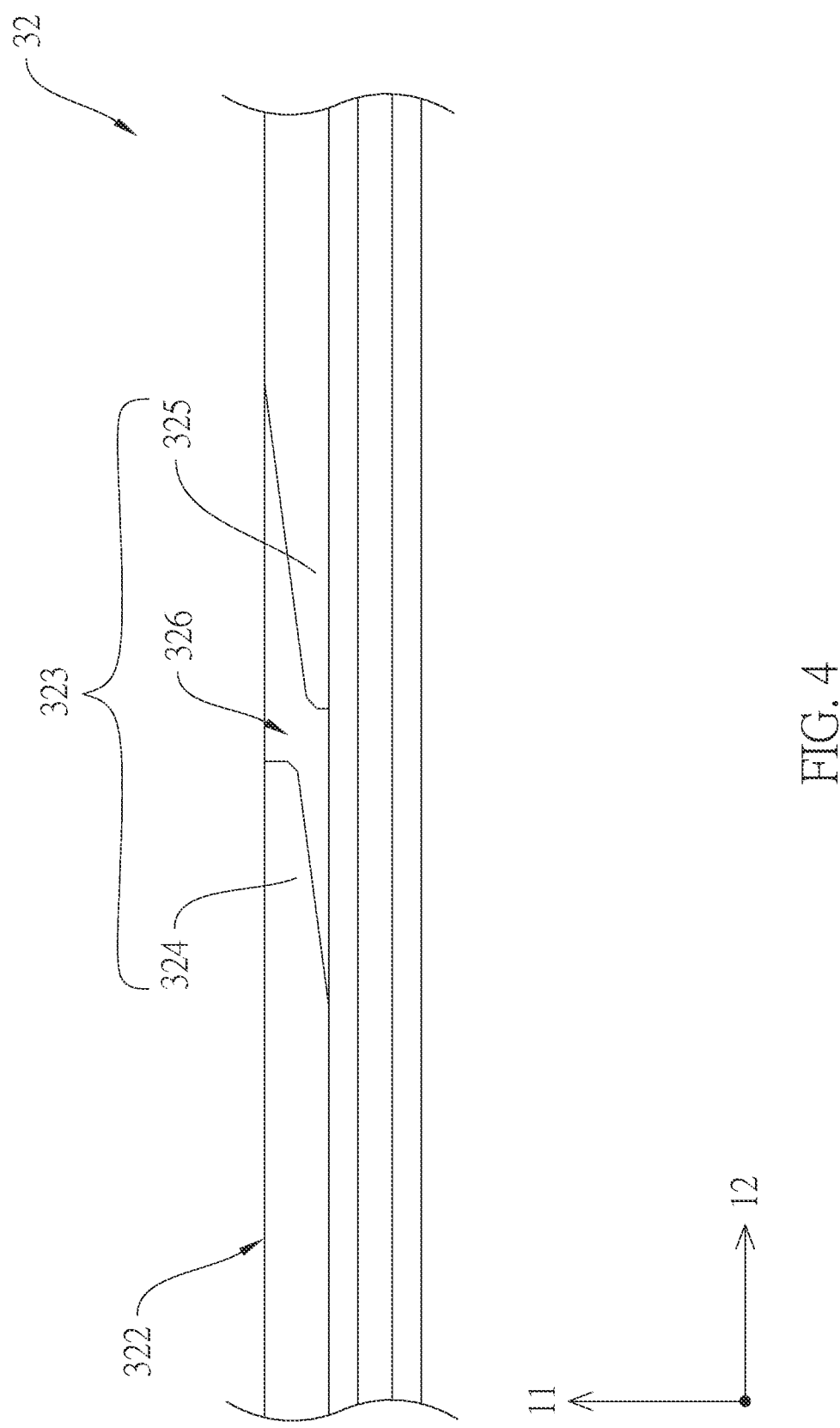
FIG. 4 is a side view diagram illustrating another configuration of the buffering zone.
Figure 5:
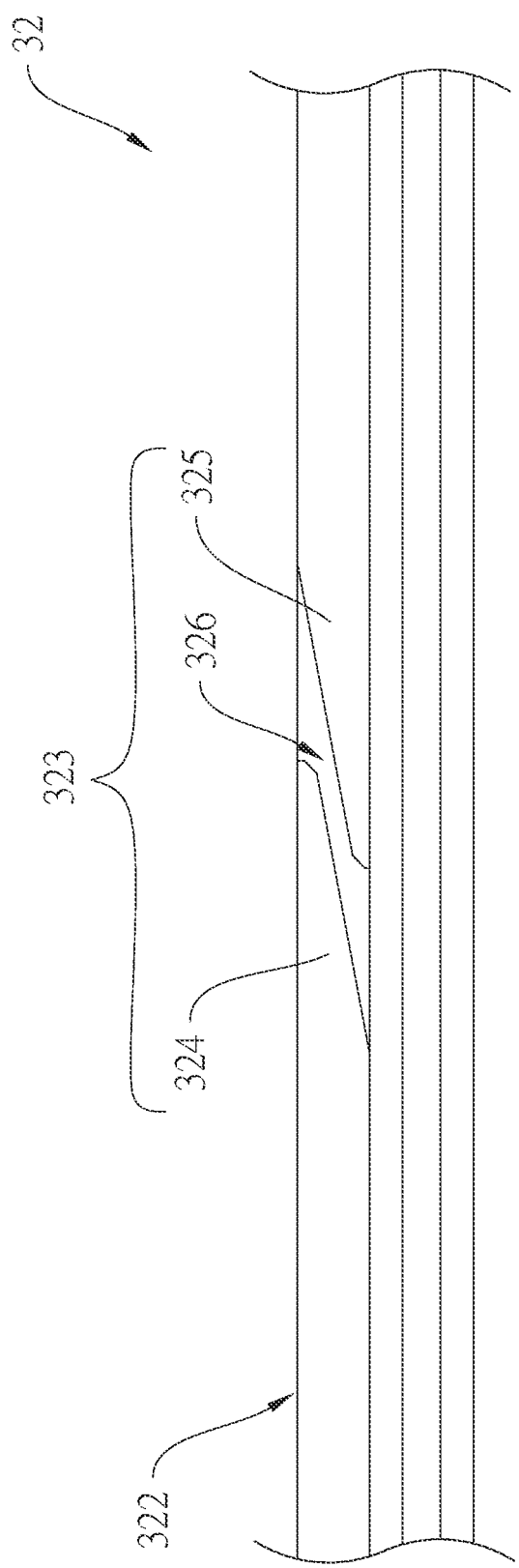
FIG. 5 is a side view diagram illustrating another configuration of the buffering zone.
Figure 6:
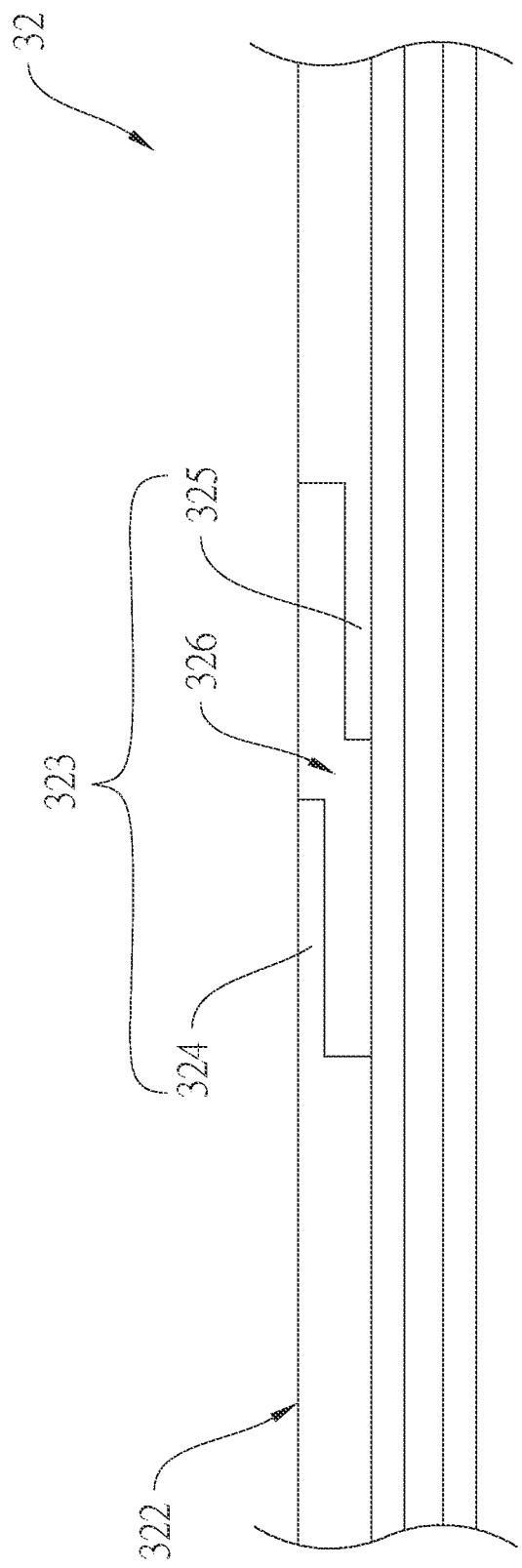
FIG. 6 is a side view diagram illustrating another configuration of the buffering zone.

Referring to FIG. 2b and FIG. 3, it is further clarified that the edges of the upper extension 324 and the lower extension 325 of each of the buffering zone 323 are aligned along the third axis 13. In other words, the upper extension 324 and the lower extension 325 do not overlap along the second axis 12. This design can be easily manufactured by a simple cutting process, making the machining process straightforward and uncomplicated. In another embodiment, as shown in FIG. 4, the edges of the upper extension 324 and the lower extension 325 of each buffering zone 323 form a gap along the second axis 12. This design accommodates materials with a higher coefficient of expansion, requiring a larger space for expansion. In some embodiments, as shown in FIG. 5, the upper extension 324 of each buffering zone 323 extends along the second axis 12, partially overlapping with the lower extension 325. This creates a double barrier effect, preventing foreign objects from intruding. In addition, in certain embodiments, the upper extension 324 and the lower extension 325 of each buffering zone 323 can also be designed with a single thickness, as shown in FIG. 6. In other words, the lower surface of the upper extension 324 and the upper surface of the lower extension 325 of each buffering zone 323 horizontally extend.

With the structural design of the slit 326 in each buffering zone 323, when the fixing frame 32 undergoes thermal expansion, the upper extension 324 and the lower extension 325 of each buffering zone 323 absorb the deformation amount generated during expansion. Therefore, the slit 326 functions similarly to an expansion joint structure, which reserves a gap for volume changes.

As shown in FIG. 2a and FIG. 2b, the slit 326 in each buffering zone 323 extends inward along the third axis 13 from the periphery of the surrounding portion 322 and does not extend into the frame portion 321. By designing the slit 326 not to extend into the frame portion 321, the risk of cutting the frame portion 321 is avoided and effectively preventing the light emitting from the light source in the optical unit 4 (shown in FIG. 1) from leaking through the slit 326. Additionally, at least one of the upper extension 324 and the lower extension 325 of each buffering zone 323 forms a gap 33 with the surrounding portion 322. The gap 33 extends in the same direction as either the upper extension 324 or the lower extension 325. In this way, it allows either the upper extension 324 or the lower extension 325 to become flexible, maintaining the compressive force of either the upper extension part 324 or the lower extension part 325, thereby providing a more immediate and comprehensive response to the volume changes of the fixing frame 32 when undergoing thermal expansion.

Figure 7:
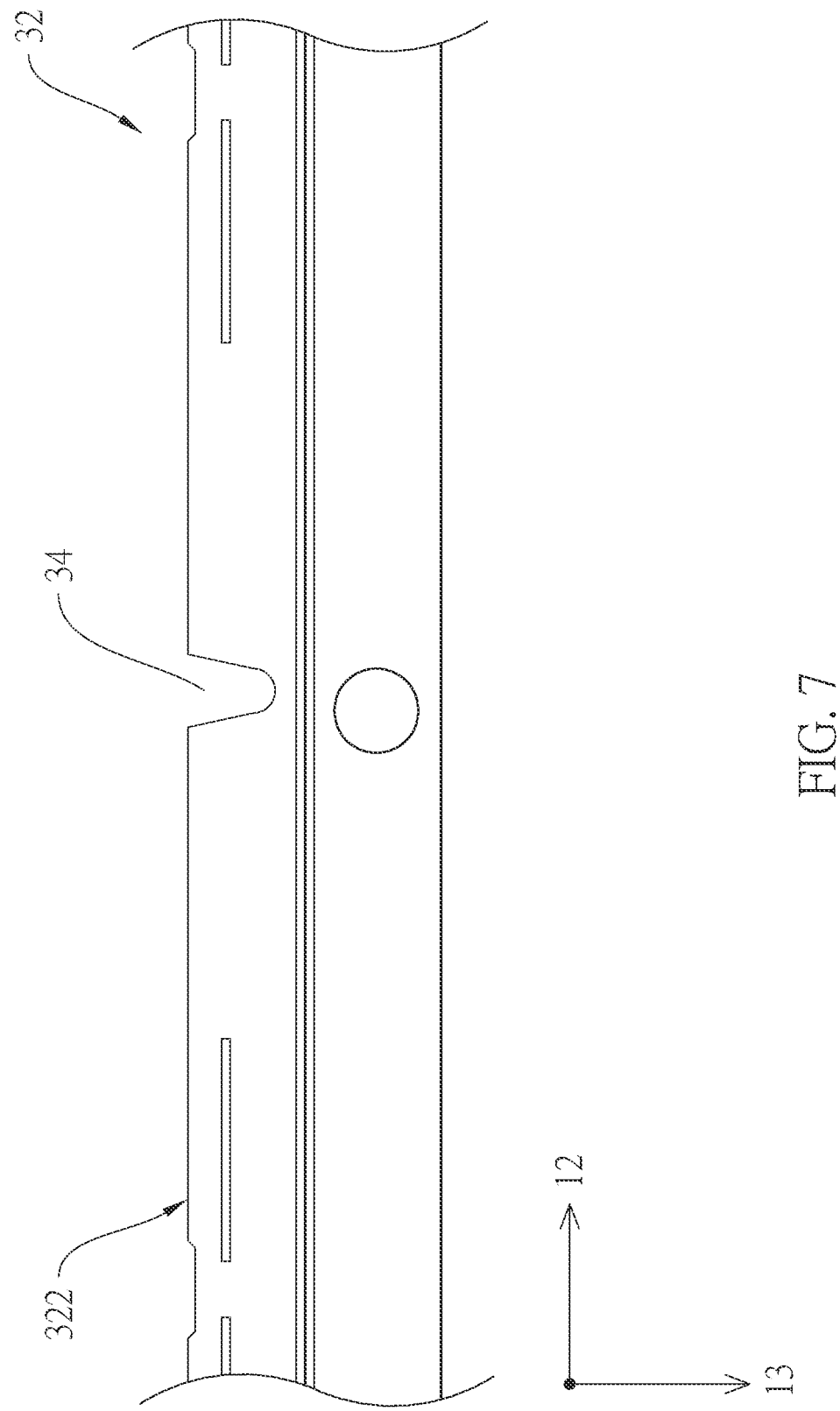
FIG. 7 is a side view diagram illustrating the fixing frame further forms at least one groove.

Referring to FIG. 7, in some embodiments, the surrounding portion 322 of the fixing frame 32 also forms at least one groove 34. The groove 34 can be V-shaped or U-shaped and extends along the direction of the third axis 13. It can evenly absorb the deformation amount caused by the thermal expansion of the fixing frame 32 on both sides of the groove 34. It should be clarified that the groove 34, depending on its placement, may also extend along the direction of the second axis 12.

Figure 8:
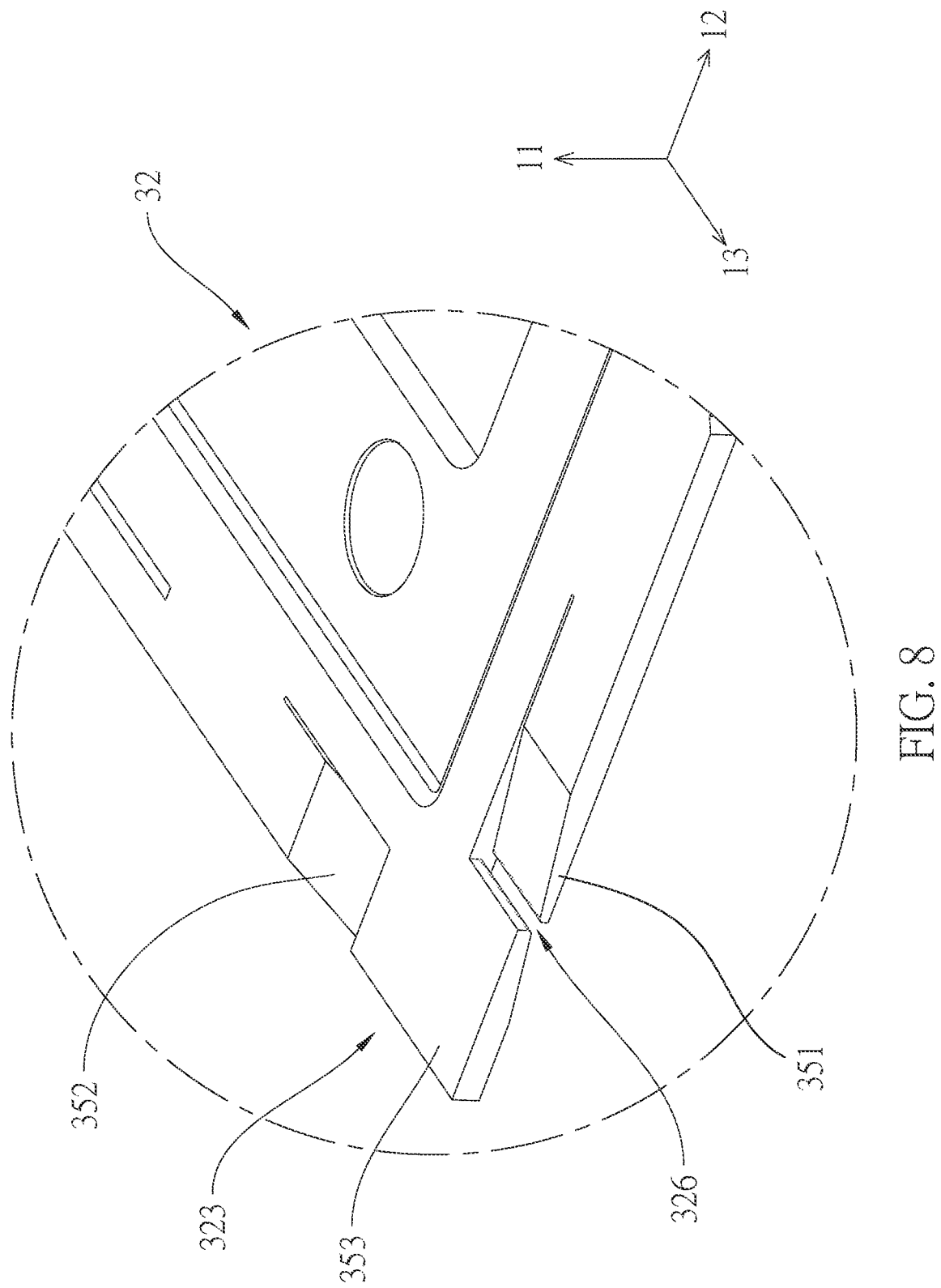
FIG. 8 is a three-dimensional diagram illustrating the structure of the buffering zone located at the corner of the fixing frame.

Apart from the previous explanation, the embodiment shown in FIG. 2a and FIG. 2b can also be defined in the following way. As shown in FIG. 1, the present invention discloses a frame structure 3. The frame structure 3 comprises a back frame 31 and a fixing frame 32 assembled on the back frame 31. Referring to FIG. 8, the fixing frame 32 comprises multiple buffering zones 323, located at various corners of the fixing frame 32. Each of the buffering zones 323 has a corner plate section 353, a first plate section 351, and a second plate section 352. Between the corner plate section 353 and the first plate section 351, as well as between the corner plate section 353 and the second plate section 352, there is a mutual spacing without contact along a first axis 11. The first plate section 351 and the second plate section 352 are located on different sides of the fixing frame 32, extending towards the corner plate section 353 and defining a slit 326.

By designing segmented shapes through the formation of the buffering zones 323 in the fixing frame 32, and within each of the buffering zones 323, the corner plate section 353 and the first and second plate sections 351 and 352 are mutually spaced along the first axis 11 without contacting, and the space for expansion deformation is preserved. With the structural design of the slit 326 in each buffering zone 323, when the fixing frame 32 undergoes thermal expansion, the first plate sections 351, the second plate sections 351, and the corner plate section 353 of each buffering zone 323 absorb the deformation amount generated during expansion. Therefore, the slit 326 functions similarly to an expansion joint structure, which reserves a gap for volume changes.

In more detail, in this embodiment, the corner plate section 353 is positioned at the corners of the fixing frame 32, and it is separately placed from the corresponding first and second plate sections 351 and 352. Consequently, the corner plate section 353 is not subjected to compression from the expansion of the first and second plate sections 351 and 352, preventing the corner plate section 353 from bulging when it is squeezed. Because the corner plate section 353 is less likely to be squeezed and bulged, the corner plate part 353 can still exert compressive force over the first plate section 351 and the second plate section 352, therefore it can effectively prevent both the first plate section 351 and the second plate section 352 from expanding too much. This, in turn, reduces the risk of the fixing frame 32 warping or coming off from the back frame 31.

Figure 9:
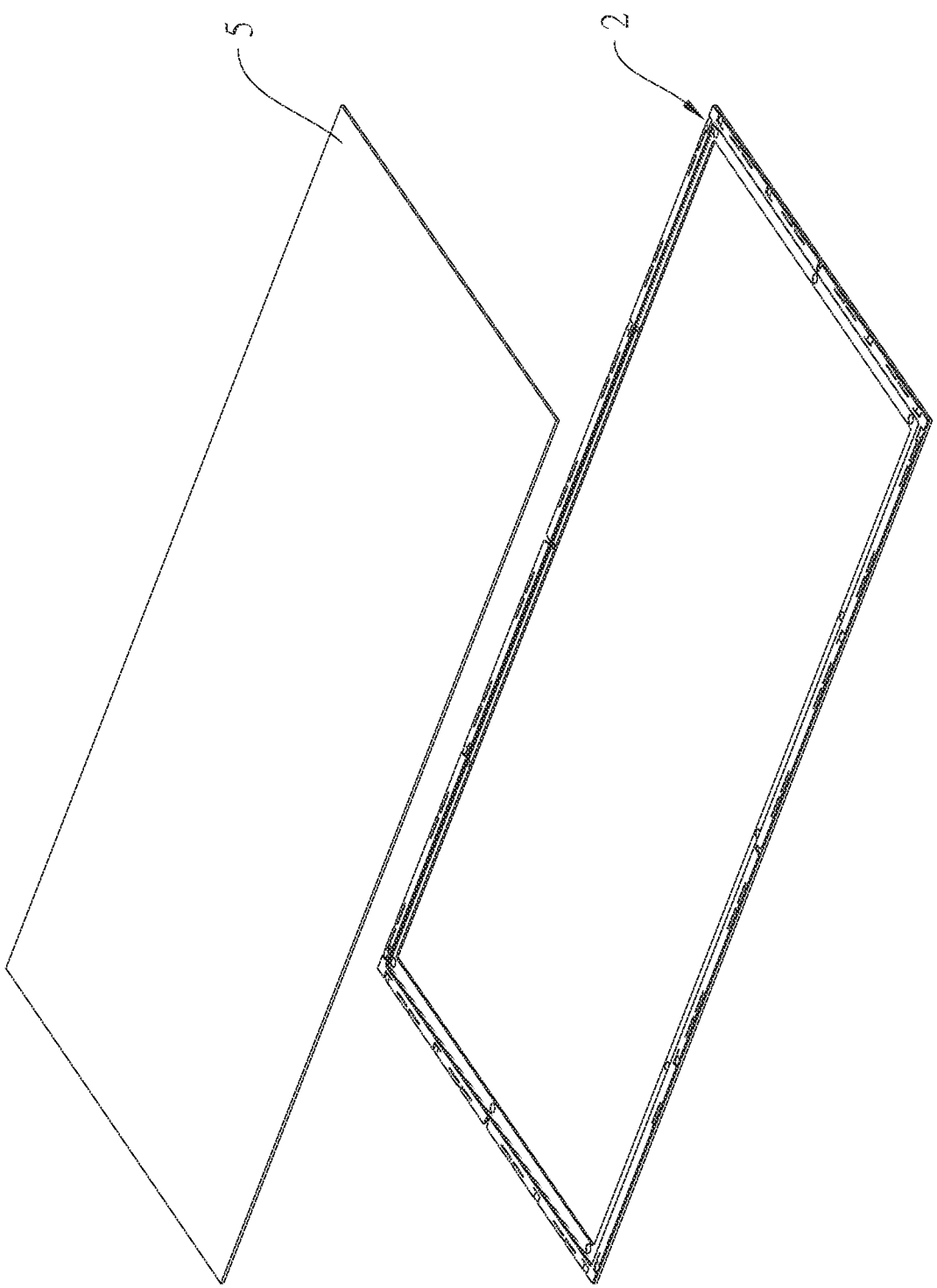
FIG. 9 is a three-dimensional exploded diagram of a preferred embodiment of the display device of the present invention.

A display panel 5 is positioned on the backlight module 2, thereby forming a display device 6 as shown in FIG. 9.

The above design is adaptable to market trends and suitable for fixing frame attached backlight modules. On the one hand, the material of the fixing frame 32 can be replaced with plastic instead of metal. On the other hand, it can meet the requirements of automotive use environments and meet with the design trend of narrow bezels for backlight module in the future.

The present invention achieves a segmented design by incorporating the buffering zones 323 within the fixing frame 32 of the frame structure 3. The design utilizes the non-contact arrangement between the upper extension 324 and lower extension 325 of the buffering zone 323 along the first axis 11, thereby preserving space for expansion deformation. When the fixing frame 32 undergoes thermal expansion, the upper extension 324 and lower extension 325 can be guided along the second axis 12, extending towards each other. This mechanism absorbs the deformation caused by the expansion of the fixing frame 32, preventing the fixing frame 32 from warping, or detaching from the back frame 31 due to thermal expansion. Consequently, it prolongs the service life of the frame structure 3.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A frame structure, comprising:
   a back frame; and
   a fixing frame attached to the back frame, wherein the fixing frame includes multiple buffering zones, each of the buffering zones having a first plate section and a second plate section, the first plate section and the corresponding second plate section being spaced apart along a first axis without mutual contact and extending towards each other along a second axis, wherein the first axis is non-parallel to the second axis;
   wherein the fixing frame comprises a frame portion and a surrounding portion around the frame portion, and the buffering zones are formed on the surrounding portion;
   wherein the surrounding portion within each of the buffering zone has a first base and a second base, the first base and the second base are spaced apart from each other, the first plate section tapers in thickness as it extends from the first base towards the second base, and the second plate section tapers in thickness as it extends from the second base towards the first base.

2. The frame structure as claimed in claim 1, wherein edges of the first plate section and the second plate section of each of the buffering zones are aligned with each other along a third axis, wherein the third axis is simultaneously perpendicular to both the first axis and the second axis.

3. The frame structure as claimed in claim 1, wherein the first plate section of each of the buffering zones extends along the second axis to partially overlap with the second plate section.

4. The frame structure as claimed in claim 1, wherein the first plate section of each of the buffering zones extends along the second axis to form a gap with the second plate section.

5. The frame structure as claimed in claim 1, wherein a lower surface of the first plate section and an upper surface of the second plate section of each of the buffering zones both horizontally extend.

6. The frame structure as claimed in claim 1, wherein a lower surface of the first plate section and an upper surface of the second plate section of each of the buffering zones both extend at an inclined angle.

7. The frame structure as claimed in claim 1, wherein a slit is formed along a third axis between edges of the first plate section and the second plate section of each of the buffering zones, and the third axis is simultaneously perpendicular to both the first axis and the second axis.

8. The frame structure as claimed in claim 7, wherein the slit of each of the buffering zones extends inward from the periphery of the surrounding portion along the third axis and does not extend to the frame portion.

9. The frame structure as claimed in claim 7, wherein at least one of the first plate section and the second plate section of each of the buffering zones forms a gap with the surrounding portion, and the gap extends in the same direction as the first plate section or the second plate section.

10. The frame structure as claimed in claim 7, wherein the surrounding portion of the fixing frame further comprises at least one groove, and the at least one groove extends along the direction of the second axis or the third axis.

11. A backlight module, comprising the frame structure as claimed in claim 1 and an optical unit, and the optical unit is jointly held and positioned by the fixing frame and the back frame.

12. A display device, comprising the backlight module as described in claim 11, and a display panel arranged on the backlight module.

* * * * *